(12) United States Patent
Contreras et al.

(10) Patent No.: US 8,107,177 B2
(45) Date of Patent: Jan. 31, 2012

(54) ELECTRICAL INTERCONNECT SYSTEM WITH INTEGRATED TRANSMISSION- LINE COMPENSATION COMPONENTS

(75) Inventors: John Thomas Contreras, Palo Alto, CA (US); Luiz Franca-Neto, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 303 days.

(21) Appl. No.: 12/317,547

(22) Filed: Dec. 23, 2008

(65) Prior Publication Data

US 2010/0157457 A1 Jun. 24, 2010

(51) Int. Cl.
*G11B 5/09* (2006.01)
*G11B 5/48* (2006.01)
*G11B 21/16* (2006.01)
*H03K 17/16* (2006.01)
*H03K 19/003* (2006.01)

(52) U.S. Cl. ...... 360/39; 360/46; 360/244.1; 360/245.3; 326/30

(58) Field of Classification Search .................. None
See application file for complete search history.

(56) References Cited

U.S. PATENT DOCUMENTS 5,608,591 A   3/1997   Klaassen
6,275,358 B1  8/2001   Balakrishnan et al.
6,708,243 B1  3/2004   Leddige et al.
6,791,429 B2  9/2004   Mikalauskas
2003/0043508 A1  3/2003  Schulz et al.
2006/0044695 A1  3/2006  Erpelding

FOREIGN PATENT DOCUMENTS

CN    1187897AA    7/1998

OTHER PUBLICATIONS

N. Hassaine, et al., High Frequency Characterization of CPW Discontinuities, Canadian Conference on Electrical and Computer Engineering, 1994. Conference Proceedings. Volume, Issue, Sep. 25-28, 1994 pp. 677-680 vol. 2. Digital Object Identifier 10.1109/CCECE.1994.405842.

Zhang Xiuqing, Examiner in Chinese Patent Office, Office Action in Chinese Counterpart Application 200910261958.5 May, 12, 2011.

*Primary Examiner* — Daniell L Negron
*Assistant Examiner* — Regina N Holder
(74) *Attorney, Agent, or Firm* — G. Marlin Knight

(57) ABSTRACT

Impedance compensation features are used along the transmission-line path between a transmitter/driver/source and the receiver/transducer to compensate for the impedance discontinuities or mismatches (for example, those caused by physical interconnection features) and/or to improve the frequency response of the signal transfer along the transmission line. The impedance compensation features are non-uniformities with impedance characteristics selected to compensate for the target impedance discontinuities. The compensation features can be non-uniformities (geometric structures designed to have specific impedance characteristics) in the electrically conductive traces that are integrated in the interconnect transmission line between the transmitter/driver/source and the receiver/transducer. The effective impedance level of the transmission line can be lowered or raised using the compensation features.

16 Claims, 6 Drawing Sheets

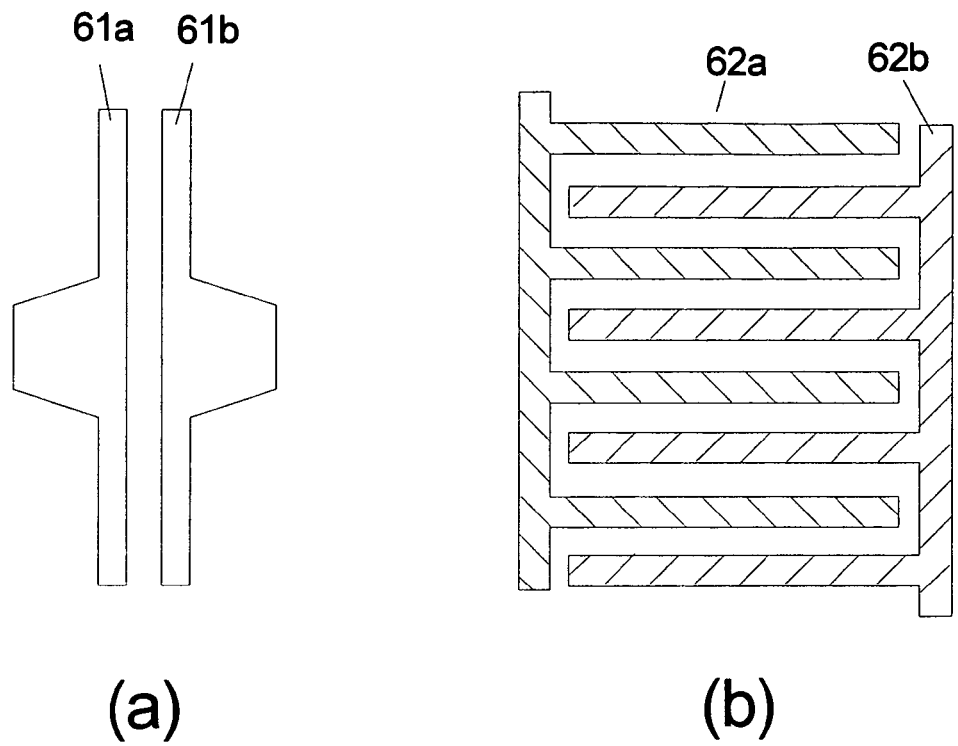
(a)  (b)
Fig. 4
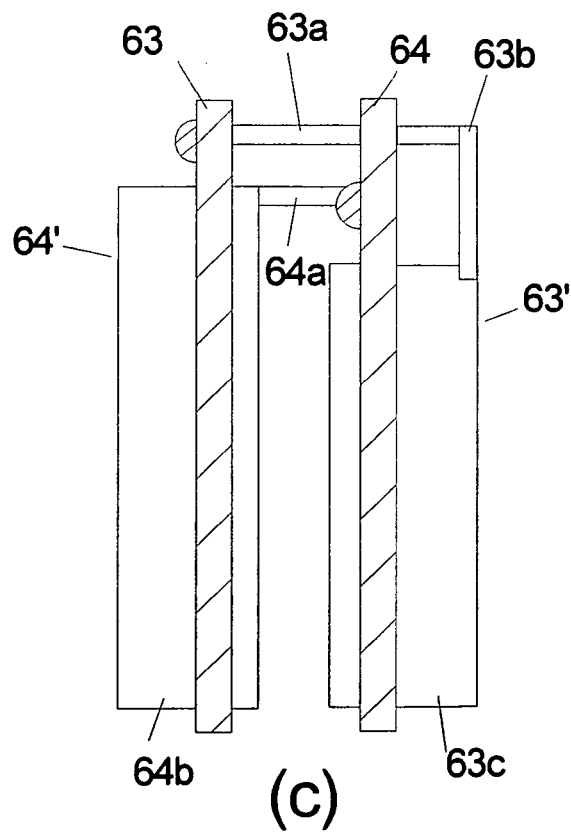
(c)

ELECTRICAL INTERCONNECT SYSTEM WITH INTEGRATED TRANSMISSION-LINE COMPENSATION COMPONENTS

FIELD OF THE INVENTION

This invention relates to systems and methods for compensating for discontinuities in the characteristic impedance of a transmission line, and more particularly compensating for the impedance discontinuities in the transmission path connecting the read/write circuitry to the read/write transducer in a magnetic-recording disk drive.

BACKGROUND

Magnetic data storage devices, such as hard disk drive (HDD) storage devices include a front-end system 10 (see FIG. 1(a)) which includes one or more read/write transducer(s) for reading and writing magnetic-data transitions in the magnetic media. The read transducer 23 and write transducer 24 are also called read head and write head or read element and write element. The part that includes the read/write transducer is typically called a slider 14. The sliders 14 are mounted on a mechanical suspension (not shown) which are then attached to a mechanical arm (actuator) (not shown) that positions the transducers over tracks on the rotating disks (not shown) which support the magnetic media film (not shown).

The electrical signals to and from the read and write transducers are processed by corresponding electronic circuitry in the read amplifier 12 and write driver transmitter 22. The write transducer 24 is an inductive coil that writes the electrical data-current signal in the media by creating a corresponding magnetic field and is considered the receiver for the write signal. The electrical data-current signal for the write transducer is created by the write driver transmitter 22 which in this example includes a differential-signal write driver 13 with source termination resistors 29a and 29b, as shown in FIG. 1(b). The read/write channel 11 reads data from the read amplifiers 12 and supplies data signals to the write driver transmitter 22. These electrical signals travel along electrically conductive paths, attached to a movable actuator (not shown), and then through the front-end interconnect 15.

FIG. 1(b) is a simplified illustration of the selected components making up the transmission-line path in the front-end interconnect 15 in a prior-art disk drive. The front-end interconnect 15 typically includes a chip-carrier interconnect 41, a suspension interconnect 42 and a gimbal interconnect 43 before reaching the read/write transducer lead pads (not shown) on the outside of the slider 14. The chip-carrier interconnect 41 impedance component is shown as $Z_A$ 32. The suspension interconnect 42 impedance is shown as impedance components 35 and 38 with a value of $Z_B$ and $Z_C$ respectively. As seen in FIG. 1(b), the gimbal interconnect 43 is a subset of the suspension interconnect 42 and is shown as impedance component 38 with a value of $Z_C$.

Electrically conductive traces are included as part of the front-end interconnect 15, and they connect the read/write transducer lead pads to the read/write electronics. The suspension interconnect 42 is typically a three layer laminate structure (not shown). The laminate layers may include a metallic signal conductor layer from which the afore-mentioned conductive traces are formed, an insulating dielectric layer, and a conductive metallic substrate layer that supports the dielectric layer.

The various electrically conductive trace structures form a transmission-line path between the write driver transmitter 22 and the write transducer 24 in the slider 14. An ideal front-end interconnect 15 should not require compensation, but in practical devices cost and technology constraints lead to discontinuities or impedance variations being present along the signal path. Prior art teaching for impedance matching in this transmission-line path (between the write driver transmitter 22 and the write transducer 24) have forced a uniform characteristic impedance ($Z_A = Z_B = Z_C$) along the signal path to reduce signal distortion and minimize signal reflections at the write driver transmitter 22, as shown in FIG. 3 (a), which will be discussed further below.

Prior art has also taught that using a single-cable interconnect impedance level has the advantages of decreased signal reflection and loss by avoiding discontinuities at junctures (since it has no junctures) and by having one constant impedance level along the entire single-cable.

Impedance matching can use discrete elements but transmission lines and stub traces (stubs) are sometimes preferable for high-frequency applications and/or small geometries. Stubs are dead-end pieces of transmission line added solely for a reactive lump effect. The two stub types are open-end ($Z_L$=infinite) and short-end ($Z_L$=0). In general, an open-end stub is capacitive and a short-end stub is inductive. FIGS. 4 and 5 illustrate different configurations of stubs, which will be discussed below.

U.S. Pat. No. 5,608,591 by Klaassen describes an integrated transducer-electronics suspension interconnect for a data recording disk drive. This type of suspension interconnect is a multi-layer laminate structure including electrically conductive traces that connect to the write transducer. Sudden changes in the characteristic impedance of these traces are avoided to minimize signal reflections. To achieve this, the width of the traces is shaped accordingly to prevent abrupt changes in the trace bonding areas, apertures and other mechanical obstructions in the suspension interconnect. Also, changes in the traces' direction are gradual to avoid signal reflection. Klaassen '591 teaches a configuration for compensating for sudden impedance changes in the suspension interconnect only. Although today, there are other suspension interconnect designs that avoid such abrupt changes in impedances levels.

U.S. Pat. No. 6,791,429 by Mikalauskas describes counteracting a transmission-line parasitic-element discontinuity by introducing a suitable amount of delay in the transmission line by way of correction impedance. The delay is calculated by taking into account, at least in part, the correction impedance and the parasitic-element effect. The correction transmission line includes an inductance or a capacitance, based on the characteristics of the parasitic element, added to a portion of the transmission line at which the parasitic element is present. The correction transmission line is positioned in the signal transmission line before or after the parasitic element, which can be a juncture, via or hinge.

Recent developments in low-impedance suspension interconnects and low-power write front-end systems create the need for improved impedance control for the complete front-end signal path or front-end interconnect.

SUMMARY OF THE INVENTION

In an embodiment of the invention, capacitive and/or inductive components (features) are used along the transmission-line path between the source (driver) and the receiver (e.g. transducer) to compensate for impedance discontinuities and/or mismatches to improve the frequency response of the write signal transfer. Another embodiment of the invention can be used to improve the frequency response of the read signal. In embodiments of the invention, the signal reflections are reduced and the signal transfer is improved for the transmission-line by adding non-uniformities with impedance characteristics selected to compensate for the impedance discontinuities inherently caused by required physical interconnection features. The compensation impedance value is generally selected so that the source impedance lies between the targeted impedance discontinuity and the compensation impedance. The invention allows integrated compensation features to be added to a transmission line without increasing the total length of the transmission line. In an embodiment for use in a typical storage system, compensation features can be non-uniformities (geometric structures) in the electrically conductive traces that are included in the transmission line between the write driver transmitter 22 and the write transducer 24. Preferably the compensation features are located near or adjacent to the discontinuity to avoid phase distortion. In embodiments of the invention the impedance-compensating components can be added between the write-driver output and the chip-carrier interconnect 41, and/or between the chip-carrier interconnect 41 and suspension interconnect 42, and/or between the suspension interconnect 42 and the write transducer 24. In addition, the subsection gimbal interconnect 43 can have additional compensation components at its interface. Embodiments of the invention include one or more compensation components in the front-end interconnect between the write driver transmitter 22 and write transducer 24 to improve the signal transfer performance. The compensation locations include the interconnect segments, but are not limited to these interface points. The front-end interconnect system also utilizes the compensation components to achieve an overall lower effective impedance level, where a lower impedance level is desirable for achieving a lower power front-end system. In alternative embodiments compensation could be used to achieve a higher overall impedance.

While the prior art teaches averaging higher impedance levels along an interconnect, this invention allows the utilization of low-impedance interconnects while allowing for high-impedance sections, such as the chip-carrier interconnect 41, by the use of compensation components. The invention also reduces transmission line reflections from any high-impedance sections, allows better use of lower impedance interconnect sections and low-power write driver designs.

BRIEF DESCRIPTION OF THE FIGURES

FIG. 4 is a simplified schematic illustration of capacitive stub traces that can be realized in interconnects for use in an embodiment of the invention: FIG. 4(a) shows wings, FIG. 4(b) shows fingers, and FIG. 4(c) shows a cross-under layer.

FIG. 5(a) shows a spiral cross-over, and FIG. 5(b) shows a snake-like feature.

DETAILED DESCRIPTION OF THE INVENTION

Figure 1A:
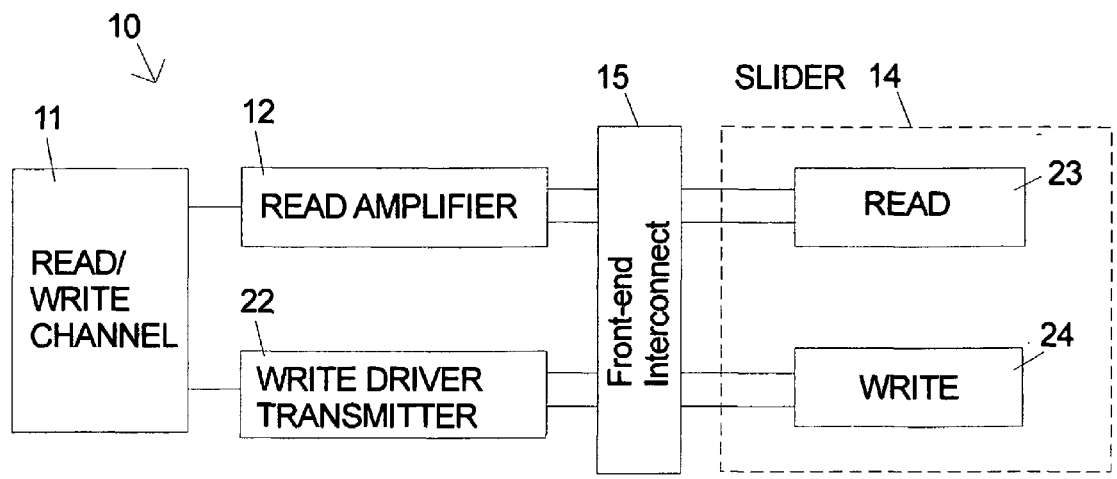
FIG. 1(a) is a simplified schematic illustration of the front-end system in a prior art disk drive.
Figure 1B:
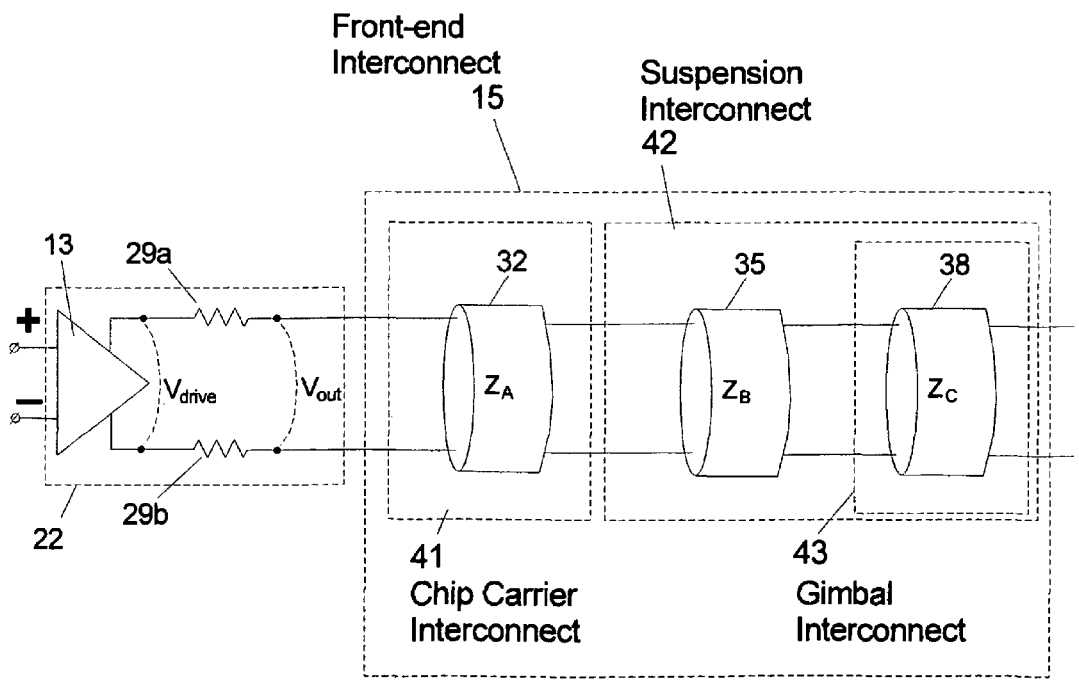
FIG. 1(b) is a simplified schematic illustration of selected interconnect sections making up the transmission-line path of the front-end interconnect in a prior art disk drive.
Figure 2:
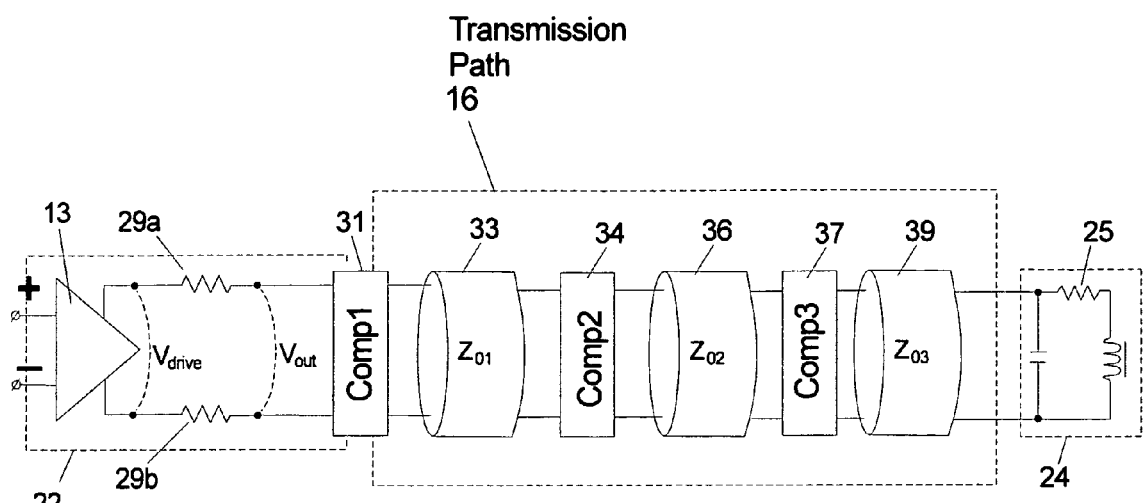
FIG. 2 is a simplified schematic illustration of an embodiment of the invention with three compensation components in the front-end interconnect between the write driver transmitter 22 and write transducer 24.

FIG. 2 is a simplified schematic illustration of an embodiment of the invention with three impedance compensation components 31, 34, 37 between the write driver transmitter 22 and the write transducer 24. This embodiment includes a write driver transmitter 22 that employs a differential-signal write driver 13 with source-termination resistors 29a and 29b. The voltage-type write driver 13 produces the signal $V_{drive}$. The write driver transmitter 22 produces the signal $V_{out}$. The transmission path 16 includes the chip-carrier interconnect impedance 33 with value $Z_{01}$, and the suspension interconnect impedances 36 and 39 with values $Z_{02}$ and $Z_{03}$ respectively. The latter impedance 39 (with value $Z_{03}$) is for the subset gimbal interconnect.

The first impedance compensation component (Comp1) 31 is shared between the resistors 29a and 29b and the chip-carrier interconnect impedance 33. In alternative embodiments the first impedance compensation component (Comp1) 31 can be located before or after the chip carrier interconnect. In general, impedance compensation components can be located before or after the targeted discontinuity in the transmission line, but the physical separation between the target and the compensation is preferably small in comparison to the wavelength of the data rate for the particular application. Too large of a separation can result in undesirable phase distortion. For example, a rule of thumb might be used that the separation should be less than 1/30 of the fundamental wavelength of the data rate (1/10 of the 3rd harmonic wavelength). For a typical write transducer in a disk drive this might result in a design decision to limit the separation to no more than 5 mm. It is also preferable that there are no intervening discontinuities between the targeted discontinuity and the compensation feature.

The second impedance compensation component (Comp2) 34 is located between the chip carrier interconnect impedance 33 and the first suspension interconnect impedance 36. The third impedance compensation component (Comp3) 37 is located between the first suspension interconnect impedance 36 and the gimbal interconnect impedance 39.

The implementation of the impedance compensation components 31, 34, 37 will be described in more detail below, but each will be part of the electrical path formed in the traces. Again, the locations of these compensation components are not limited to these specific locations described here.

Figure 3A:
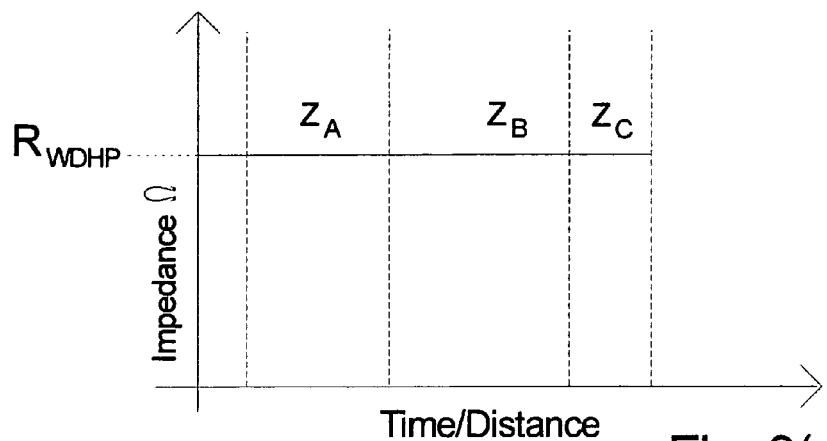
FIG. 3(a) is a graph used to illustrate the prior art impedance profiles requiring high-power (HP). The graph in FIG. 3(b) shows a prior art example using low-impedance interconnects, but with impedance constraints for the chip-carrier interconnect 41 and the gimbal interconnect 43. The graph in FIG. 3(c) illustrates the use of the compensation components according to an embodiment of the invention utilizing low-impedance interconnects that use low-power (LP).
Figure 3B:
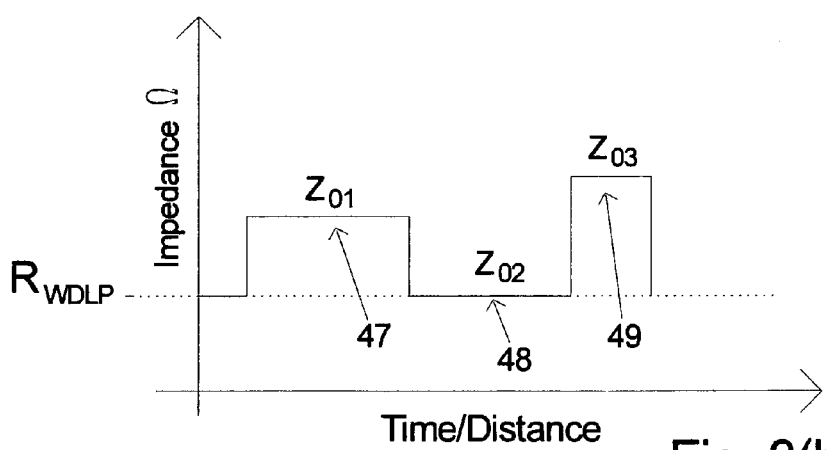
Figure 3C:
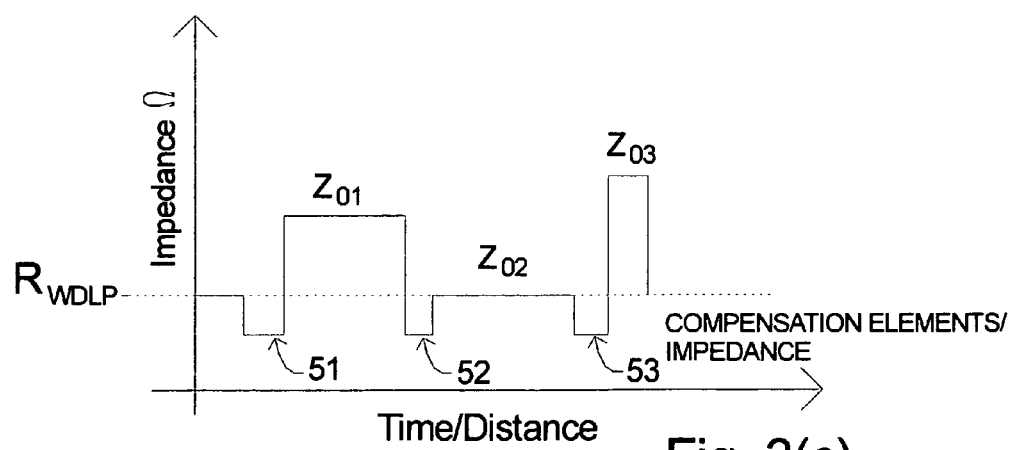

FIGS. 3(b) and 3(c) are graphs that will be used to illustrate the functioning of the compensation components according to an embodiment of the invention. The idealized graphs are inspired by the concepts used in time domain reflectometry (TDR). A TDR drives a transmission line with a signal step, and then records the reflected signal as a function of time. If the conductors making up the transmission line have a constant impedance level, the signal step will have a constant voltage response. Impedance discontinuities cause some of the signal to be reflected back to the transmitter (the write driver in this case). In general, impedance discontinuities cause a reflective voltage with respect to the driving pulse and impedance. The time that these discontinuities arrive at the TDR is a function of the physical distance along the transmission line where the discontinuities are present.

The impedance profile of an electrical interconnect can graphically map the individual conductive trace impedances along a non-uniform transmission line. The vertical scale for FIGS. 3(a-c) represents impedance and the horizontal scale represents the time or distance where the corresponding transmission line segment or component is positioned. For the write driver (WD), the ideal impedance level is shown as the horizontal $R_{WDHP}$ line, for a high-power (HP) system. The value of $R_{WDHP}$ is lower ($R_{WDLP}$) in FIGS. 3(b) and 3(c) than in FIG. 3(a), for a low-power (LP) system.

FIG. 3(a) illustrates an example of the impedance of a prior art transmission line comprising uncompensated actuator interconnects in a storage system with a relatively high-impedance level for all the segments in the front-end interconnect. In this case, a high-power supply level is required to sustain a high-impedance level.

FIG. 3(b) shows the prior art case with a low-impedance level for segment 48 corresponding to the impedance $Z_{02}$ of the suspension interconnect in FIG. 2. The goal is to sustain a high-performance level with a low-power supply, yet the performance is hampered by the impedance discontinuity caused by the chip-carrier interconnect, segment 47 corresponding to the impedance $Z_{01}$. The performance may also be hampered by the gimbal interconnect, segment 49 corresponding to the impedance $Z_{03}$. FIG. 3(b) also shows a newer lower power impedance level ($R_{WDLP}$) as compared to the one in FIG. 3(a), and the graph shows a drop in impedance level for the interconnect segment 48. This lower impedance level, $R_{WDLP}$, supports lower power supply voltages, but as mentioned above, the impedance of the chip-carrier interconnect can hamper the performance.

FIG. 3(c) shows the impedance profile for a transmission path with impedance compensation components of the invention combined with the $Z_{01}$, $Z_{02}$ and $Z_{03}$ transmission path segments. The first impedance compensation component (Comp1) 31 is selected to produce segment 51 in FIG. 3(c) which lowers the effective transmission-line impedance from the uncompensated $Z_{01}$ value. In general, the design of the impedance compensation components can be thought of as using the total transmission-line impedance and the portion contributed by the interconnect discontinuity to derive a new impedance compensation discontinuity which, when located sufficiently close to the interconnect discontinuity as described above, can be treated as forming a single combined discontinuity with advantageous impedance properties. The compensation impedance value is selected so that the source impedance, e.g. $R_{WDLP}$ for $Z_{01}$, lies between the impedance discontinuity and the compensation impedance. In the example of FIG. 3(c) the impedance discontinuity $Z_{01}$, is higher than $R_{WDLP}$, so the compensating impedance value is selected to be lower than $R_{WDLP}$.

Similarly the second impedance compensation component (Comp2) 34 is selected to produce segment 52 that assists the compensation of transmission-line impedance $Z_{01}$ value. Note that the source impedance for $Z_{01}$ is equal to $R_{WDLP}$ for this example. The third impedance compensation component (Comp3) 37 may optionally be added to produce segment 53, for the case where transmission-line impedance $Z_{03}$ is relatively high. The overall effect of the impedance compensation according to the invention in this example is to improve the signal transfer characteristics in the presence of large transmission-line discontinuities, such as the chip-carrier interconnect. The invention also reduces aggregate transmission line reflections from any high-impedance sections. But it should be noted that, contrary to the teaching in the prior art, the impedance along the transmission line is made less uniform by the impedance compensation components.

The three segments of the impedance profile 51, 52, 53 which correspond to compensation components 31, 34, 37 are located before the targeted interconnect elements that they are compensating for. In other embodiments of the invention, some or all of the compensation components can be located at different locations along the transmission path. One notable feature of the impedance profile of a transmission line according to the invention is that the total length of the transmission line is not increased; therefore, the length of the integrated compensation components improves the signal transfer from the write driver transmitter 22 to the write transducer 24.

Discontinuities are steps or abrupt changes in impedance. For example, non-uniformity in the middle of the transmission line forms two discontinuities. The discontinuity and the compensation can be treated as forming a single combined compensated discontinuity. FIG. 3(c) show the impedance levels with the new combined compensated discontinuity as being the same length as the original interconnect, because the compensation feature consumes part of the total of the interconnect, the length is not increased.

The invention can be implemented using any techniques available to the designer that are practical for altering the impedance of the transmission line for the particular application. Techniques for determining the impedances of the compensation components will be described in the next section. In some applications it might be possible to use standard discrete capacitors or inductors for the compensation components, but in the case of disk drive actuators, it will generally be preferable to use the capacitance and inductance that can be created by the physical design of conductor traces along the front-end interconnect transmission path. The small physical space available on a practical actuator for a disk drive constrains the physical size of the traces that can be used to construct the compensation components. Also, in the case of the write transmission-line path, low-power write applications require a low impedance level. This means that components with primarily capacitive impedance will generally be easier to implement than those that are primarily inductive.

FIGS. 4(a-c) are simplified schematic illustrations of capacitive components or features that can be realized in conductive traces on actuators for use in an embodiment of the invention. In each of the examples, the geometric conductive trace features are built into the conductive path that extends from the write driver transmitter 22 to the write transducer 24. FIG. 4(a) shows a simple set of "wings" 61a and 61b that can be built into the conductive traces to add capacitance as needed in any of the three compensation components 31, 34, 37, for example. The wings 61a, 61b and/or other features are formed from the electrically conductive material and are integrated into the conductive path to alter the impedance characteristics of the transmission line. In standard actuators the thickness of the conductive material deposited for traces will generally be uniform, so the wings and other similar features can be formed by varying the width of the traces. FIG. 4(b) shows intertwined "fingers" 62a and 62b or intermeshed comb-like structures that likewise can be built into the conductive traces to add capacitance by varying the shape of the traces.

The compensation features in the conductive traces can also be constructed with multiple layers using standard techniques such as those used for making conductive paths on circuit boards. A multi-phase process in which two or more layers of conductive material separated by dielectric material are deposited, masked, etched can be used to form features with complex geometries including vias with conductive material that form connections between pads of material in different layers. FIG. 4(c) shows a "cross-under layer" design in which the left and right paths 63, 64 each have stubs 63', 64' that extend under the other path to create low-impedance capacitance components. The stubs are also formed from the electrically conductive material. Thus, path 63 has a stub 63' comprising of elements 63a, 63b, and 63c that extend under path 64 but do not make direct physical contact with path 64 because they are separated by dielectric material (not shown). Component 63c is a plate-like structure that is placed directly under path 64 (as shown) and may be wider than path 64. Path 64 has stub 64' comprising of elements 64a, 64b that extend under path 63 but do not make direct physical contact with path 63. This feature can be formed by depositing and patterning at least two layers of electrically conductive material separated by a layer of dielectric material with vias of electrically conductive material connecting the appropriate areas in the conductive layers for the left and right paths. The stubs 63', 64' and associated components can be formed in one layer and connected by vias to material in another layer that forms the main path. Although the stubs pass under the opposite paths in the embodiment shown in FIG. 4(c), the stubs can be above or placed in any adjacent orientation with respect to the opposite path that creates the desired amount of capacitance. In this structure the left and right parallel paths may or may not be symmetrical, but the design goal is to keep the differential line pair balanced.

Figure 5A:
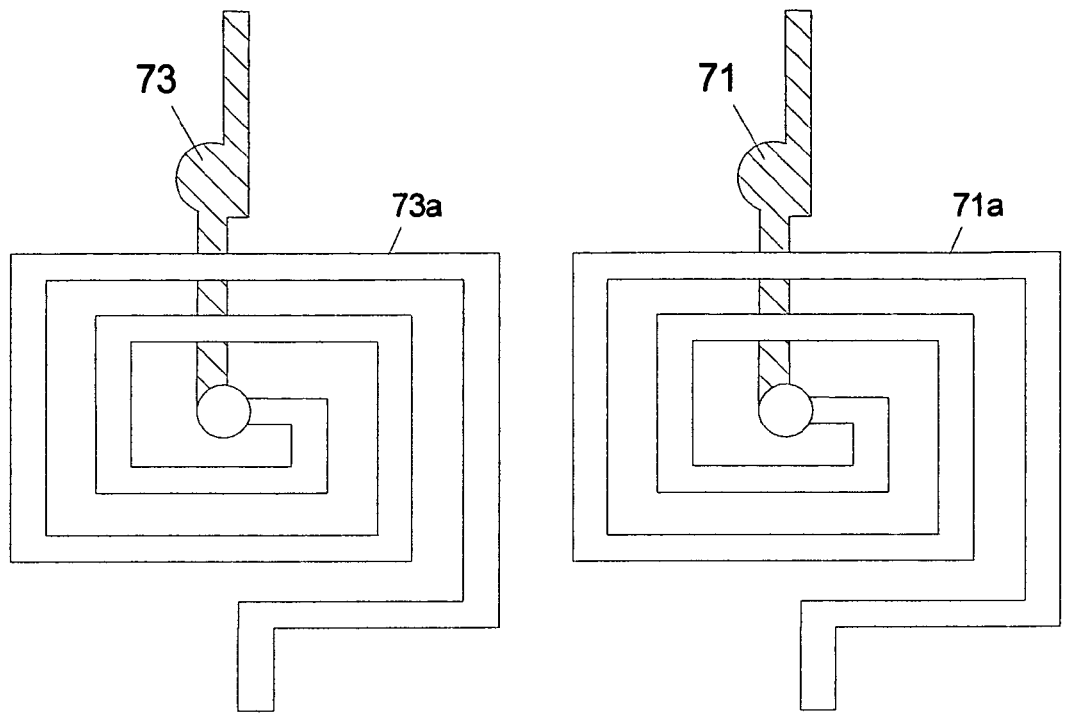
FIGS. 5(a) and 5(b) are simplified schematic illustrations of inductive stub traces that can be realized in interconnects for use in embodiments of the invention.
Figure 5B:
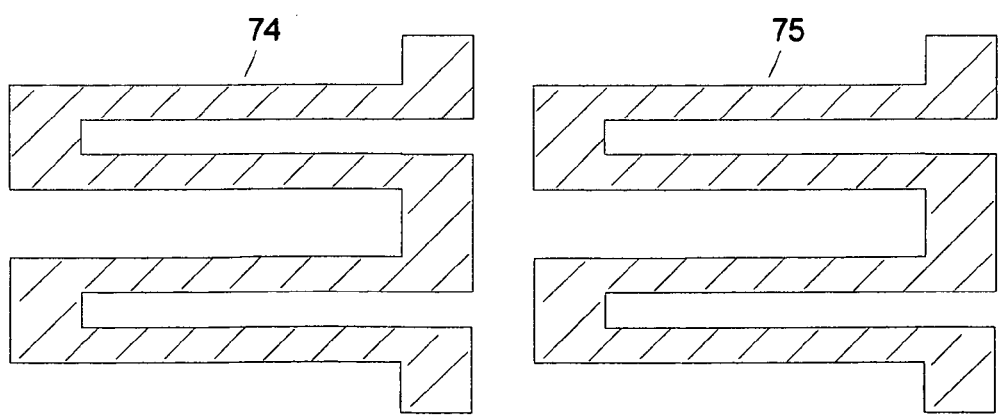

FIGS. 5(a) and 5(b) are simplified schematic illustrations of inductive components that can be realized in front-end traces for use in an embodiment of the invention. FIG. 5(a) shows a spiral cross-over in which element 73 passes under the spiral 73a in the left trace and element 71 passes under the spiral 71a in the right trace. FIG. 5(b) shows a simple serpentine geometry built into the left and right traces 74, 75, respectively.

Determining Compensation Values

The design of a particular embodiment, using a prior art voltage-type write-driver system will be described to illustrate the principles, but different source and or chip-carrier interconnect impedance levels will result in different implementation solutions. The voltage-type write-driver 13 as shown in FIG. 2 uses a symmetric voltage drive that has a source termination resistance at the output ($V_{out}$) of the write driver transmitter 22. This source termination $R_{WD}$ is split in two, so that the series resistors 29a, 29b are each $R_{WD}/2$. The write driver transmitter 22 output is connected to the write transducer 24 through the segmented transmission path 16 that includes a chip-carrier interconnect impedance 33 and two suspension interconnect impedances 36, 39 with the respective differential characteristic impedance values of $Z_{01}$, $Z_{02}$ and $Z_{03}$. As mentioned above, prior art solutions have strived for equivalent characteristic impedances and for the impedance level to be relatively high, for example above 70Ω.

The write transducer 24 is the receiver in the write driver system, and the transmission line reflection at the receiver is expressed in Equation 1. The dominant impedance of the write transducer 24 is the resistor value 25 with a write transducer's impedance value of Zh, for frequencies less than 6 GHz. Typically, the write transducer's impedance is less than the suspension interconnect's impedance. Therefore, the termination from the write transducer will create a negative reflection.

$$\Gamma = \frac{Zh - Z_0}{Zh + Z_0} \qquad \text{Eq. 1}$$

The write-driver transmitter's 22 output impedance $R_{WD}$ can be designed to be equivalent or greater than the characteristic impedance $Z_{02}$ of the suspension interconnect. This output impedance value configuration is considered over-terminated ($R_{WD}>Z_{02}$), and the write signals are well behaved and can have a desirable overshoot. There are signal reflections from the write transducer 24, because the write transducer's impedance value (Zh) is under-terminated (Zh<$Z_{02}$). Therefore, the reflected signal is then terminated at the $V_{out}$ part of the write-driver transmitter's output.

In addition, the write current ($I_W$) is determined by the $V_{drive}$ voltage as seen in FIG. 2. Equation 2 shows the expression for the write current, and typically the write transducer (head) resistance, $R_H$, is much less than the termination resistance (RWD).

$$I_W = \frac{V_{drive}}{(R_{WD} + R_H)} \approx \frac{V_{drive}}{R_{WD}} \qquad \text{Eq. 2}$$

Therefore from Equation 2, the $V_{drive}$ voltage is determined from the required write current ($I_W$), as shown in Equation 3.

$$V_{drive} = I_W R_{WD} \qquad \text{Eq. 3}$$

The launched voltage, $V_{out}$, is then determined by the voltage, $V_{drive}$, and the characteristic impedance of the chip-carrier interconnect impedance, $Z_{01}$, as shown in Equation 4.

$$V_{out} = \frac{I_W R_{WD} Z_{01}}{R_{WD} + Z_{01}} \qquad \text{Eq. 4}$$

As mentioned above, the value of the write-driver transmitter's output impedance $R_{WD}$ can be designed to be greater than or equivalent to the chip-carrier interconnect effective impedance value $Z_{01}$. When the write-driver transmitter's output impedance is equivalent ($R_{WD}=Z_{01}$), Eq. 4 is simplified to the Equation 5.

$$V_{out} = \frac{I_W Z_{01}}{2} \qquad \text{Eq. 5}$$

Equation 5 shows that, by reducing the chip-carrier interconnect effective impedance value, $Z_{01}$; the required $V_{out}$ voltage is then reduced. When the $V_{out}$ voltage is reduced, the power supply voltage requirement is then reduced. The required power supply voltage is low with a low chip-carrier effective impedance value $Z_{01}$ and suspension interconnect impedance value $Z_{02}$. The same conclusion is reached for the $V_{drive}$ voltage, because the output impedance can now be designed to be a low value (<30Ω).

For example, if a 50 mA write current ($I_W$) is required and the $R_{WD}$ and $Z_{01}$ impedance values are 20Ω, then by using Eq. 3 and Eq. 5, the voltage would be 1V and 0.5V for $V_{drive}$ and $V_{out}$ respectively.

As mentioned before, ideally, no compensation is required for the front-end interconnect. Yet cost and technology constraints force discontinuities or impedance variations along the signal path. Specifically, the chip-carrier interconnect is typically a high-impedance interconnect section. Current suspension designs can have a relatively uniform interconnect impedance level. The embodiment described in this example uses only the first and second compensation components 31, 34, and where the $Z_{02}$ and $Z_{03}$ values are equivalent. For this condition, the impedance of the output ($Z_{out}$) before $Z_{02}$ is shown in Equation 6. For Equation 6, $Z_{01}$ is the characteristic impedance value of the chip-carrier interconnect, β is the phase constant, and L is the total length of $Z_{01}$. By inspection, when $R_{WD}$ is equal to $Z_{01}$, the output impedance value Zout is equal to $R_{WD}$.

$$Zout = Z_{01} \frac{R_{WD} + iZ_{01}\tan\beta L}{Z_{01} + iR_{WD}\tan\beta L} \qquad \text{Eq. 6}$$

Practical physical implementations show that $Z_{01}$ is nearly twice the value of $R_{WD}$, and for this condition, compensation components 31, 34 are required to make the output impedance equivalent to $R_{WD}$. Under these impedance conditions Equation 6 can be approximated by Equation 7.

$$Zout \approx R_{WD} + iZ_{01}\tan\beta L = R_{WD} + iZ_{01}\tau_{pd}\omega \qquad \text{Eq. 7}$$

Where: β=phase constant, L=length of $Z_{01}$, $\tau_{pd}$=propagation delay of $Z_{01}$, and ω=frequency in radians As mentioned above, compensation is added to make the effective output impedance Zout equivalent to the source impedance $R_{WD}$ or an impedance level suited for the desirable signal response at the receiver, such as the case in using over-termination. For this case with a relative large value of $Z_{01}$, capacitive compensation is included to create an effective characteristic impedance for the chip-carrier interconnect. Equation 8 shows the calculation of the capacitive values for compensation components 31 and 34, derived from the effective inductance ($Z_{01}\tau_{pd}$, subpart of Eq. 7), the characteristic impedance equation (sqrt(L/C)), and the source impedance ($R_{WD}$).

$$C_{comp31} = \frac{Z_{01}\tau_{pd}}{2R_{WD}^2}, \qquad \text{Eq. 8}$$

$$C_{comp34} = \frac{Z_{01}\tau_{pd}}{2R_{WD}^2}$$

Where: $C_{comp31}$=compensation for 31, $C_{comp34}$=compensation for 34

In Equation 8, the terms for comp31 and comp34 are identical, but it can be noted that the total (comp31+comp34) can be distributed unequally. For example, an embodiment might use 1.1*comp31+0.9*comp34 to arrive at the total. Redistributing the compensation might be beneficial, for example, when the area allowed for one of the compensation features is restricted making it difficult to achieve lower impedance levels, and redistribution of the compensation components is possible when the distance between the components is relatively short (<1/10 wavelength of the fundamental). For Eq. 8, the source impedance value may be the source impedance value of the write driver transmitter 22 $R_{WD}$ or it may be replaced with a transmission path impedance value at a different location, so that compensation components can be placed at other locations along the transmission path.

In addition, as shown in FIG. 3(c), the compensation components can be constructed with very-low impedance segments, 51 and 52. These short segments would use Equation 9 to determine the effective capacitance value.

$$C_{compC} = \frac{\tau_{pdC}}{Z_{0C}} \qquad \text{Eq. 9}$$

Figure 6:
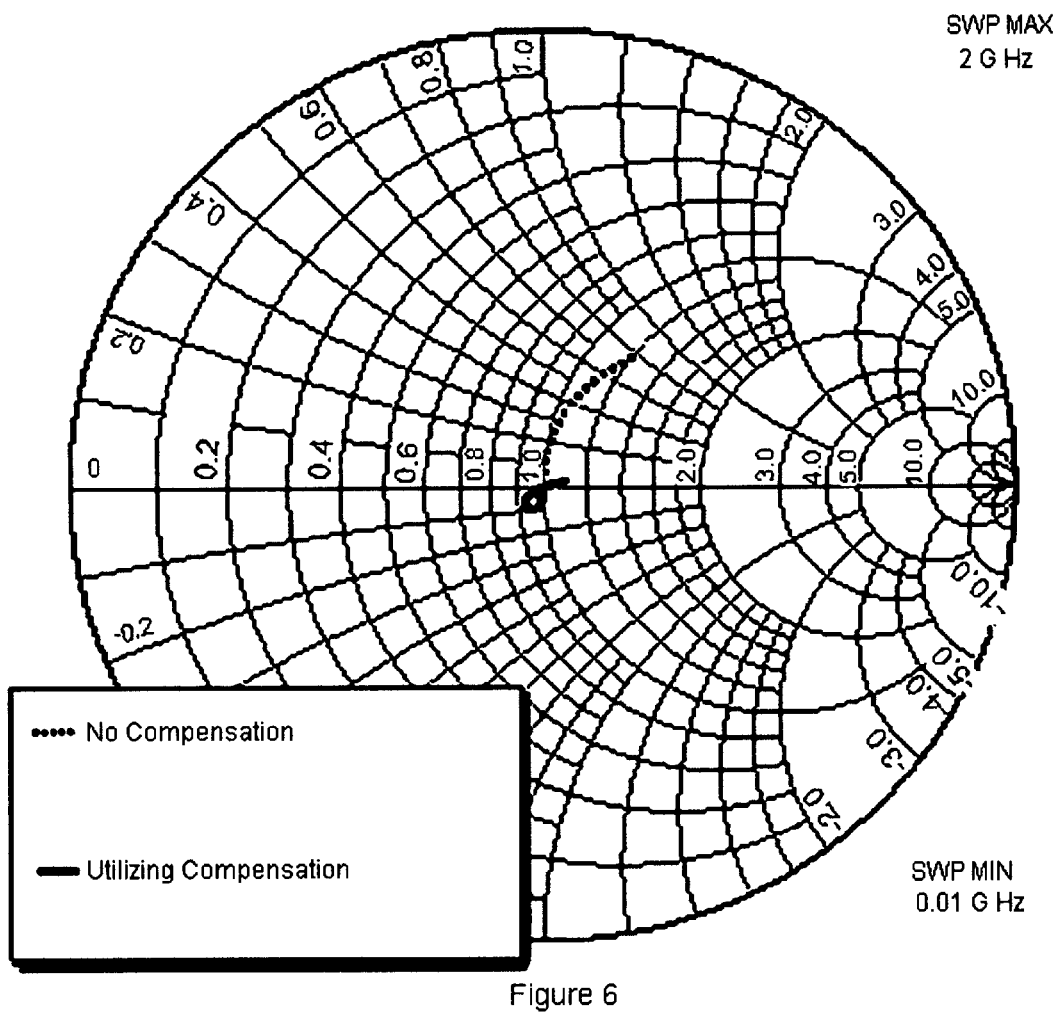
FIG. 6 shows the Smith chart used to illustrate the invention, which shows effects with and without compensation correction.

Where: $C_{compC}$=compensation capacitance, $\tau_{pdC}$=propagation delay of Short segment, $Z_{0C}$=characteristic impedance of the short segment Using a standard Smith chart, we can graph the benefits of using $C_{comp31}$ and $C_{comp34}$ so that the system is matched, for high data rate applications. In the Smith charts in FIG. 6, the new output impedance $Z_{out}$, that includes $R_{WD}$, $Z_{01}$ $Z_{02}$, and the compensation $C_{comp31}$ $C_{comp34}$, is shown from 0.01 to 2 GHz. The dotted solid line shows the effects with mismatched $Z_{01}$ and $Z_{02}$ without compensation, and the bold solid line shows an embodiment of the invention with compensation correction.

The Smith chart plots the reflection (($Z_{out}-R_{WD}$)/($Z_{out}+R_{WD}$)), and reducing the reflection improves the signal transfer. Therefore, a transmission system is matched when the reflection and or impedance is centered on the Smith Chart of FIG. 6. Without compensation and with the physical constraints limiting the $Z_{01}$ impedance, the line spirals away from the center (dash line, no compensation). Using $C_{comp31}$ and $C_{comp34}$, the compensation brings back the impedance to the center (solid line). The compensation allows for a high frequency performance write system with low-impedance interconnects.

This front-end interconnect design has a new and novel effective impedance level range (<30Ω) by providing compensation components to provide an overall lower interconnect impedance value. By utilizing a lower interconnect impedance level, voltage requirements for the power supply is drastically reduced. In addition, compensation components are added to provide high performance with physical imperfections along the front-end interconnect. As mentioned above, instead of requiring high power voltages used previously (+/−5V (10V)), the compensation components allow the use of low power supply voltages such as 1.8V.

In contrast, some interconnect structures inherently have a very low impedance level where inductive compensation is then required, and short inductive segments can be constructed. These short segments would use Equation 10 to determine the effective inductance value.

$$L_{compL} = \tau_{pdL}Z_{01} \qquad \text{Eq. 10}$$

Where: $L_{compL}$=compensation inductance, $\tau_{pdL}$=propagation delay of Short segment, $Z_{0L}$=characteristic impedance of the short segment The invention has been described in the form of specific embodiments. Alternatives and variations, such as compensating the read transmission-line path, which are apparent or obvious to those with skill in the art are intended to be within the scope of the invention.

The invention claimed is:

1. An apparatus comprising:
   a transmitter;
   a receiver; and
   a transmission line connecting the transmitter and the receiver, the transmission line including:
   a first interconnection feature forming a first non-uniformity having a first impedance discontinuity that generates a first signal reflection corresponding to an impedance higher than a source impedance; and a compensation feature in electrically conductive traces integrated in the transmission line that forms a second non-uniformity, the compensation feature having an impedance that compensates for the first non-uniformity by generating a second signal reflection corresponding to an impedance lower than the source impedance.

2. The apparatus of claim 1 wherein the compensation feature has an impedance derived at least in part from a source impedance, an impedance of the first non-uniformity and a propagation delay of the first non-uniformity.

3. The apparatus of claim 1 wherein the impedance of the compensation feature is directly proportional to an impedance of the first non-uniformity and propagation delay of the first non-uniformity and is inversely proportional to a source impedance.

4. The apparatus of claim 1 wherein a value of a source impedance is between a value of impedance of the first non-uniformity and a value of impedance of the compensation feature.

5. The apparatus of claim 1 wherein the transmission line includes first and second substantially parallel traces of electrically conductive material and the compensation feature consists of symmetrical non-uniformities in a geometry of the electrically conductive material in first and second substantially parallel traces.

6. The apparatus of claim 1 wherein the transmission line includes parallel traces of electrically conductive material of uniform thickness and the compensation feature includes non-uniformities in a width of the electrically conductive material.

7. The apparatus of claim 1 wherein the transmission line includes parallel traces of electrically conductive material deposited in at least first and second layers and the compensation feature includes non-uniformities in the electrically conductive material in first and second layers.

8. The apparatus of claim 1 wherein the compensation feature has left and right paths with stubs or fingers that add capacitance and extend toward an opposite path without making physical contact.

9. The apparatus of claim 1 wherein a distance between the compensation feature and the first non-uniformity is less than $\frac{1}{30}$ of a fundamental wavelength of a data rate of transmission on the transmission line.

10. The apparatus of claim 1 wherein the compensation feature does not increase the total length of the transmission line.

11. An apparatus comprising:
a transmitter;
a transducer mounted on a movable actuator; and
a transmission line connecting the driver and the transducer, the transmission line including:
a chip carrier interconnect with a first impedance forming a first impedance discontinuity in the transmission line;
a first compensation feature forming a second impedance discontinuity in the transmission line, the first compensation feature compensating at least in part for the first impedance discontinuity, the first compensation feature being formed from electrically conductive material integrated in the transmission line that is disposed non-uniformly on the movable actuator;
a suspension interconnect forming a third impedance discontinuity in the transmission line; and
a suspension interconnect compensation feature adjacent to the suspension interconnect and the suspension interconnect compensation feature partially or completely compensating for the third impedance discontinuity of the suspension interconnect, the suspension interconnect compensation feature being formed from electrically conductive material integrated in the transmission line that is disposed non-uniformly on the movable actuator.

12. The apparatus of claim 11 wherein the impedance of the first compensation feature is derived at least in part from a source impedance, the first impedance discontinuity and a propagation delay of the first impedance discontinuity so that a value of the source impedance is between a value of the characteristic of the first compensation feature and a value of the transmitter impedance.

13. The apparatus of claim 11 wherein the first compensation features does not increase a total length of the transmission line.

14. An apparatus comprising:
a transmitter;
a transducer mounted on a movable actuator; and
a transmission line connecting the driver and the transducer, the transmission line including:
a chip carrier interconnect with a first impedance forming a first impedance discontinuity in the transmission line;
a first compensation feature forming a second impedance discontinuity in the transmission line, the first compensation feature compensating at least in part for the first impedance discontinuity, the first compensation feature being formed from electrically conductive material integrated in the transmission line that is disposed non-uniformly on the movable actuator;
a gimbal interconnect forming a third impedance discontinuity; and
a gimbal interconnect compensation feature adjacent to the gimbal interconnect and the gimbal interconnect compensation feature partially or completely compensating for the third impedance discontinuity of the gimbal interconnect, the gimbal interconnect compensation feature being formed from electrically conductive material integrated in the transmission line that is disposed non-uniformly on the movable actuator.

15. The apparatus of claim 11 wherein a distance between the first compensation feature and the first interconnect is less than $\frac{1}{30}$ of a fundamental wavelength of a data rate of transmission on the transmission line.

16. An apparatus comprising:
a transmitter;
a transducer mounted on a movable actuator; and
a transmission line connecting the driver and the transducer, the transmission line including:
a first interconnect with a first impedance forming a first impedance discontinuity in the transmission line; and
a first compensation feature forming a second impedance discontinuity in the transmission line, the first compensation feature compensating at least in part for the first impedance discontinuity, the first compensation feature being formed from electrically conductive material integrated in the transmission line that is disposed non-uniformly on the movable actuator;
wherein the first interconnect generates a first signal reflection corresponding to an impedance higher than a source impedance and the first compensation feature generates a second signal reflection corresponding to an impedance lower than the source impedance.

* * * * *